United States Patent
Cordes et al.

[19]

[11] Patent Number: 5,833,267
[45] Date of Patent: Nov. 10, 1998

[54] PASSENGER-RESTRAINING SYSTEM IN MOTOR VEHICLES

[75] Inventors: Jürgen Cordes; Holger Schrimpf, both of Braunchweig, Germany

[73] Assignee: Volkswagen AG, Wolfsburg, Germany

[21] Appl. No.: 915,657

[22] Filed: Aug. 21, 1997

[30] Foreign Application Priority Data

Feb. 20, 1997 [DE] Germany .................. 197 06 723.9

[51] Int. Cl.$^6$ .................................. B60R 21/04
[52] U.S. Cl. .................. 280/751; 280/733; 280/805; 297/470; 297/471; 297/472
[58] Field of Search ................. 280/751, 733, 280/805, 801.1, 748; 297/470, 471, 472, 488

[56] References Cited

U.S. PATENT DOCUMENTS

| | | | |
|---|---|---|---|
| 3,232,665 | 2/1966 | Von Wimmersperd | 280/751 |
| 3,865,433 | 2/1975 | Stafford | 297/390 |
| 3,945,678 | 3/1976 | Neuman | 297/390 |
| 3,957,303 | 5/1976 | Mauron | 297/216 |
| 4,067,608 | 1/1978 | Von Wimmersperg | 297/216 |
| 4,159,127 | 6/1979 | Czernakowski et al. | 280/751 |
| 4,502,732 | 3/1985 | Williams | 297/488 |
| 4,765,685 | 8/1988 | Sadoh et al. | 297/488 |

FOREIGN PATENT DOCUMENTS

| | | |
|---|---|---|
| 43 40 937 | 6/1994 | Germany . |
| 195 14 837 | 11/1995 | Germany . |
| 1440707 | 6/1976 | United Kingdom .......... 280/751 |

*Primary Examiner*—Christopher P. Ellis
*Attorney, Agent, or Firm*—Cohen, Pontani, Lieberman & Pavane

[57] ABSTRACT

A passenger-restraining system, in particular for children and wheelchair occupants in motor vehicles. The restraining system includes at least one safety-belt arrangement with a lap belt and an associated cushion element. The cushion element has a body made of at least one cushion material which can be deformed, absorbing energy in the process, and has a guide slit for the lap belt. The element also has an insert which is embedded in the deformable cushion material and surrounds the guide slit. In order to convert a large amount of kinetic energy into deformation work in the cushion element, and thus to dissipate said kinetic energy, without there being any risk of injury to the individual secured by the restraining system, the insert includes, a plurality of layers of a thin, flexible foil, sheet material and/or fabric which are separated from one another by a layer of the cushion material.

27 Claims, 1 Drawing Sheet

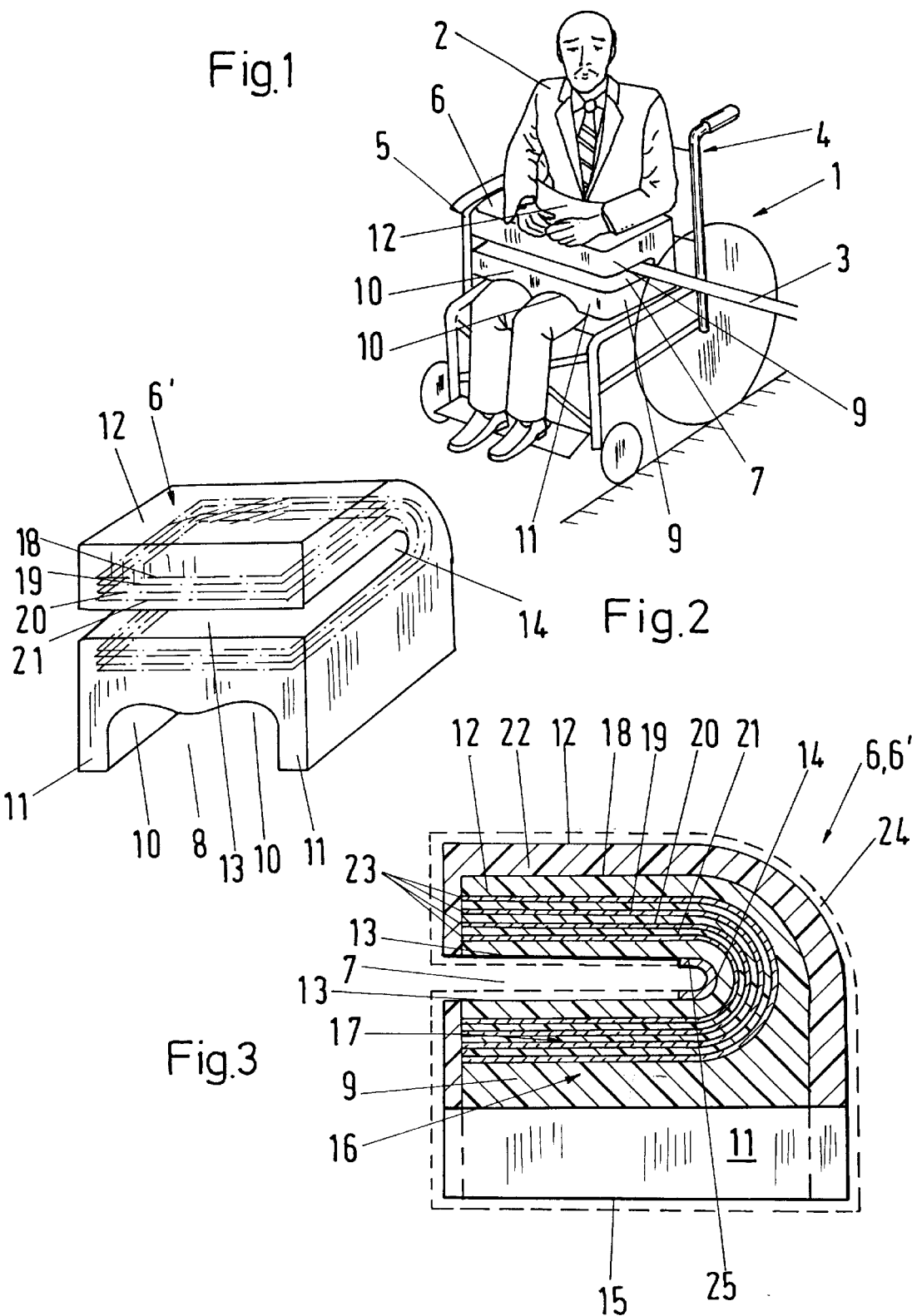

PASSENGER-RESTRAINING SYSTEM IN MOTOR VEHICLES

BACKGROUND OF THE INVENTION

1. Field of the Invention

The invention relates to a passenger-restraining system which is suitable, in particular, for children and wheelchair occupants in motor vehicles. Such a system includes at least one safety-belt arrangement with a lap belt and an associated cushion element. The cushion element has a body made of at least one cushion material which can be deformed, absorbing energy in the process, and has a guide slit for the lap belt, and also has an insert which is embedded in the deformable cushion material and surrounds the guide slit. The invention further relates to a cushion element for a passenger-restraining system which is suitable, in particular, for children and wheelchair occupants in motor vehicles. Such a cushion element includes a body made of at least one cushion material which can be deformed, absorbing energy in the process, having a guide slit for a lap belt of a safety-belt arrangement of the passenger-restraining system, and having a functional part which is retained in the deformable cushion material and surrounds the guide slit.

2. Description of the Prior Art

A passenger-restraining system for wheelchair occupants in motor vehicles and a cushion element of the type mentioned above are known from the document DE 195 14 837 A1 of the Applicant. In the case of the known cushion element, which is guided between armrest parts and is retained by the lap belt, the guide slit, which is open in the direction of travel, subdivides the cushion element into two tongues with reinforced, deformation-resistant walls. Thus in the event of the wheelchair occupant being displaced forward in an accident, the wall regions at the free end of the tongues compress and deform the cushion material, as a result of which kinetic energy is converted into deformation work and the forces acting on the wheelchair occupant are thus reduced. In order to improve the energy conversion, a metallic deformation element is also embedded in this case, as a functional part, in the cushion element. The deformation element is formed by a metal insert which is retained essentially in the manner of a hinged bracket, surrounds the guide slit in a U-shaped manner at its end counter to the direction of travel, and is embedded in the cushion material. However, in the event of the wheelchair occupant and the cushion element being displaced forward to a very pronounced extent in an accident, the bracket-like metal insert may result in injuries if the lap belt, which is retained in a stationary manner, pushes it rearward, counter to the direction of travel, out of the cushion element after the cushion material provided between the wall of the belt-guide slit and the metal insert has been compressed. The same applies to the top part of the reinforced wall of the belt-guide slit, it likewise being possible for the top part to cause injuries in the event of the upper body of the wheelchair occupant making impact on the top side of the cushion element. The reinforced wall of the belt-guide slit may also be taken as a functional part within the context of the invention. However, a less rigid guide-slit wall or a less rigid metal insert would adversely affect the extent of the energy conversion in the event of displacement in an accident since deformation of the wall and the metal insert would take place instead of compression of the cushion material.

German reference DE 43 40 937 A1, also of the present Applicant, also discloses a passenger-restraining system for wheelchair occupants and a cushion element of the type mentioned above, in the case of which a support part, which is enclosed by a flexible/elastic cushion layer and is compliant and thereby absorbs energy, is provided in the cushion element. It is possible for the support part to be formed, for example, by a metal profile which is embedded in a foamed-plastic cushion, although there are no further details in the reference concerning the design of said metal profile.

SUMMARY OF THE INVENTION

Taking this as the departure point, the object of the present invention is to improve a passenger-restraining system and a cushion element of the type mentioned above to the effect that a large amount of kinetic energy is converted into deformation work in the cushion element, and is thus dissipated, without there being any risk of injury to an individual secured by the restraining system.

This object is achieved according to the invention in that the insert comprises a plurality of layers of a thin, flexible foil, sheet material and/or fabric, each of these layers being separated from one another by a layer of the cushion material. The invention is based on the idea that, by using a thin flexible insert material, the risk of the insert injuring the secured individual can be reduced considerably and, furthermore, in comparison with the known insert, the extent of energy conversion can be increased even further since, on the one hand, the lap belt at the rear end of the guide slit compresses the cushion material between the individual foil, sheet-material and/or fabric layers, absorbing energy in the process, and, on the other hand, in the event of a restraining action, the foil, sheet-material and/or fabric layers embedded in the cushion material is pulled in the direction of the secured individual, whereas the cushion element and the secured individual are accelerated in the direction of travel, with the result that the foil, sheet-material and/or fabric layers above and beneath the belt-guide slit is expanded, likewise absorbing energy in the process, and the cushion material arranged therebetween is also deformed by shearing forces, absorbing energy in the process.

Use is preferably made here of high-strength foils, sheets and/or fabrics, for example steel or aluminum foils having a thickness of from 0.1 to 0.3 mm, high-strength sheets made of tear-resistant plastic of low extensibility, for example PET, fabrics made of aramid fibers or other high-strength textile fibers, tear-resistant mats made of glass-fiber-reinforced or carbon-fiber-reinforced plastic or other thin high-strength synthetic fabrics, for example the fabrics used for air bags, where the term fabric is also intended to cover nonwovens and the like.

The foil, sheet material and/or fabric preferably comprises a plurality of mutually parallel foil, sheet-material and/or fabric blanks which are located one above the other and are arranged at a distance from one another in a U-shaped manner around the belt-guide slit. The blanks extend essentially parallel to the inner delimiting surfaces of the belt-guide slit.

Alternatively, it is possible for the cushion material to have embedded in it either a plurality of separate foil, sheet-material and/or fabric blanks or a foil, sheet-material and/or fabric blank which is folded, in meandering fashion and whose layers are folded over at the front end. The energy absorption is further enhanced in the latter case since the cushion material behind the U-shaped front ends is compressed to a more pronounced extent.

A further embodiment of the invention provides for the cushion material to consist at least partially of a foamed plastic material, for example PUR foam, in which the foil, sheet material and/or fabric is foamed in place directly during the production of the cushion element. The foamed plastic material preferably has different hardnesses, the foil, sheet-material and/or fabric blanks preferably being embedded in a rigid foam, while a flexible-foam covering is provided at least on the top side of the cushion element. The covering serves for damping the impact of the upper body of the secured individual in the event of displacement in an accident.

According to a further advantageous embodiment of the invention, the flexible-foam covering is also provided laterally on the cushion element so that it encloses and conceals any edges of the foil, sheet-material and/or fabric blanks which project out of the rigid foam for production-related reasons.

BRIEF DESCRIPTION OF THE DRAWING

The invention is explained in more detail hereinbelow with reference to an exemplary embodiment illustrated in the drawing, in which:

FIG. 1 shows a schematic perspective view of a passenger-restraining system with an inventive cushion element for a wheelchair which is taken along in a motor vehicle;

FIG. 2 shows a perspective view of an inventive cushion element for securing a child traveling in a motor vehicle; and FIG. 3 shows a sectional side view of the cushion element of FIGS. 1 and 2 along a vertical center plane.

DETAIL DESCRIPTION OF THE PREFERRED EMBODIMENTS

The restraining system 1, illustrated in FIG. 1, for a wheelchair-bound individual 2 traveling in a motor vehicle essentially comprises a lap belt 3, which can be stretched from its end which is fastened rigidly on the motor vehicle, over the wheelchair 4 and the pelvis of the individual 2, to a belt buckle (not illustrated) which receives the free end of the belt. The restraining system further comprises a shock-absorbing pad or pelvic cushion 6 which rests on the thighs of the individual 2, is guided laterally by frame parts 5 of the wheelchair 4 and has a horizontal guide slit 7. The guide slit 7 is bounded vertically by two tongues 9, is open in the direction of travel at the front end and is configured to accept the lap belt 3.

The pelvic cushion 6' which is illustrated in FIG. 2, can be fastened, in a manner corresponding to FIG. 1, by means of a lap belt or a three-point belt (not illustrated). The cushion 6, 6' are intended for securing a wheelchair occupant or a child traveling in a motor vehicle. The pelvic cushion 6 is designed as one piece and, on its underside, has a recess 8 which is adapted to the thighs of the secured individual 2, i.e. of the wheelchair occupant or of the child. The recess 8 is bounded laterally by two side pieces 11 and has two upwardly curved thigh-receiving hollows 10 running from front to rear. On its top side 12 and on its rear side, which faces the individual 2, the pelvic cushion 6, 6' is respectively shaped in a planar and smoothly rounded manner, this encouraging the upper body of the individual 2 to roll on the pelvic cushion 6, 6' in the event of high negative acceleration in an accident. The guide slit 7 passes through the pelvic cushion 6, 6' transversely with respect to the direction of travel, and is bounded by planar delimiting surfaces 13 on its top side and underside and by a rounded delimiting surface 14 at its rear end.

In the case of the pelvic cushion 6' provided for children, the recess 8 is bounded laterally by two side pieces 11 which are of larger vertical dimensions than the wheelchair 6 of FIG. 1. The undersides 15 of the side pieces 11 bear on a seat cushion of a seat shell or rear seat bench of the motor vehicle (not illustrated), with the result that the child's legs do not have the weight of the pelvic cushion 6' bearing on them during use.

The pelvic cushion 6, 6' essentially comprises a rigid-foam core 16 which encloses the guide slit 7 towards the top, bottom and rear, bounds the recess 8 towards the top and forms the two side pieces 11 on the sides of the recess. The core 16 also comprises an insert 17 made of a plurality of thin, high-strength foil, sheet-material or fabric blanks 18, 19, 20, 21 which are embedded in the rigid-foam core 16. A flexible-foam covering 22 covers the rigid-foam core 16 towards the front, top, rear and to the sides. While, on the top side and on the rear side of the pelvic cushion 6, 6', the flexible-foam covering 22 serves to damp any impact of the upper body of the secured individual 2 which may be caused in an accident, its purpose, towards the front and to the sides, is to cover the cut-off (or possibly projecting) edges 23 of the foil, sheet-material or fabric blanks 18, 19, 20, 21 so that these cannot be seen from the outside.

The respectively congruent foil, sheet-material or fabric blanks 18, 19, 20, 21 may consist of the same or different materials and are foamed in place in a plurality of layers (four layers in the drawing), one above the other in the rigid-foam core 16, the layers being spaced apart by a distance of from 1 to 2 cm in each case. The foil, sheet-material or fabric blanks 18, 19, 20, 21, which are folded over in a U-shaped manner in cross section and are foamed in place in the two tongues 9, surround the guide slit 7 on its top side, bottom side and rear end. The blanks running essentially parallel to the delimiting surfaces 13, 14 of the guide slit 7. The mutually adjacent layers are separated from one another within the tongues 9, and in particular at the end of the guide slit 7, in each case by a rigid-foam layer.

While the rigid foam 16 preferably consists of polypropylene or polyurethane having a density of from 20 to 40 g/l or from 50 to 70 g/l, respectively, possible materials which may be used for the foil, sheet-material or fabric insert 17 are thin metal plates, thin high-strength plastic webs or tear-resistant fibers which are woven or held together in non-woven or mat form by a curing binder, with the result that the foil, sheet-material or fabric blanks 18, 19, 20, 21 have a high tensile strength and low extensibility in the direction of their extent.

In the event of the motor vehicle being involved in a head-on collision, it is slowed down abruptly, whereas, as a result of his or her inertia, the individual 2 secured by the lap belt 3 and the pelvic cushion 6, 6' continues to move in the direction of travel and pushes the pelvic cushion 6, 6' forwards by the force of his or her pelvis. In this case, the lap belt 3 cuts into the pelvic cushion 6, 6' at the rear end of the guide slit 7 and compresses it there. The rigid foam 16 between the lap belt 3 and the insert 17 and between the individual layers of the insert rupture, while absorbing energy during the process, and the fragments are ground down by rubbing against one another. Moreover, the result of the forward movement of the secured individual 2 and of the pelvic cushion 6, 6' in relation to the stationary lap belt 3 is that the lap belt 3 exerts a reaction force, which is counter to the force of inertia, on the center of the flexible foil, sheet-material or fabric blanks 18, 19, 20, 21,1 and the latter absorb this reaction force. This produces tensile forces within the foil, sheet-material or fabric blanks 18, 19, 20, 21, ten these tensile forces, in turn, cause the foil, sheet-material or fabric blanks 18, 19, 20, 21 to extend and/or move in the direction of the reaction force, and, in the latter case, the rigid foam 16 adhering to the surfaces of said blanks absorbs energy as a result of the opposing direction of movement of the pelvic cushion 6, 6' and shears off when subjected to overloading. In this case, some of the kinetic energy of the secured individual is likewise converted into deformation work and is thus absorbed by the pelvic cushion 6, 6', as a result of which it is possible to reduce the loading to which the pelvis of the secured individual 2 is subjected.

It is possible to simplify the overall design of the cushion body in the region of the guide slit 7 if, rather than having a belt-guide rail inserted in the guide slit 7, a cushion cover 24 has a highly tear-resistant section sewn in, or sewn on, in the region of the base of the slit. Eliminating the belt-guide rail renders production simpler and handling easier.

We claim:

1. A passenger-restraining system, comprising:
    at least one safety-belt arrangement including a lap belt;
    an associated cushion element, the cushion element having a body composed of at least one deformable cushion material and formed with a guide slit for the lap belt; and,
    at least one functional part embedded in the cushion element so as to at least partially surround the guide slit, the functional part including a plurality of layers of at least one of a thin, flexible foil, a sheet material and a fabric, each of the layers being separated from one another by a layer of the cushion material.

2. A passenger-restraining system according to claim 1, wherein the plurality of layers of at least one of foil, sheet material and fabric include at least one sheet made of a high-strength plastic material.

3. A passenger-restraining system according to claim 1, wherein the plurality of layers of at least one of foil, sheet material and fabric include at least one metal foil.

4. A passenger-restraining system according to claim 1, wherein the plurality of layers of at least one of foil, sheet material and fabric include at least one fabric made of a tear-resistant fiber material.

5. A passenger-restraining system according to claim 1, wherein the plurality of layers of at least one of foil, sheet material and fabric include at least one mat made of one of a glass-fiber-reinforced plastic and a carbon-fiber-reinforced plastic.

6. A passenger-restraining system according to claim 1, wherein the plurality of layers of at least one of foil, sheet material fabric include a plurality of separate blanks of at least one of foil, sheet-material and fabric arranged one above the other.

7. A passenger-restraining system according to claim 1, wherein the plurality of layers include at least one blank of at least one of foil, sheet-material and fabric that is folded in a meandering fashion.

8. A passenger-restraining system according to claim 1, wherein the plurality of layers are separated by essentially equal distances.

9. A passenger-restraining system according to claim 1, wherein the plurality of layers of the at least one of foil, sheet material and fabric comprise individual essentially congruous blanks.

10. A passenger-restraining system according to claim 1, wherein the guide slit has upper and lower delimiting surfaces, the plurality of layers being arranged to extend essentially parallel to the delimiting surfaces of the guide slit.

11. A passenger-restraining system according to claim 1, wherein the cushion material consists at least partially of a foamed material in which the plurality of layers are foamed in place.

12. A passenger-restraining system according to claim 11, wherein the cushion material is a rigid foam, and further comprising a flexible-foam covering at least on a top side of the cushion element.

13. A passenger-restraining system according to claim 12, wherein the flexible-foam covering is configured to cover edges of the plurality of layers which one of project beyond the rigid foam and are cut off at delimiting surfaces of the rigid foam.

14. A cushion element for a passenger-restraining system having a lap belt, the cushion element comprising:
    a body made of at least one deformable cushion material having a guide slit for the lap belt; and
    a functional part retained in the deformable cushion material so as to surround the guide slit, the functional part including a plurality of thin flexible layers of at least one of a foil, a sheet material and a fabric, each of the layers being separated from one another by a layer of the cushion material.

15. A cushion element according to claim 14, wherein the plurality of layers of the at least one of foil, sheet material and fabric include at least one sheet made of a high-strength plastic material.

16. A cushion element according to claim 14, wherein the plurality of layers include at least one metal foil.

17. A cushion element according to claim 14, wherein the plurality of layers include a fabric made of a tear-resistant fiber material.

18. A cushion element according to claim 14, wherein the plurality of layers include at least one mat made of one of a glass-fiber-reinforced plastic and a carbon-fiber-reinforced plastic.

19. A cushion element according to claim 14, wherein the plurality of layers are blanks of the at least one of foil, sheet material and fabric arranged above one another.

20. A cushion element according to claim 14, wherein the plurality of layers includes at least one blank folded in a meandering fashion.

21. A cushion element according to claim 14, wherein the plurality of layers are arranged so that distances between individual layers are essentially equal.

22. A cushion element according to claim 14, wherein individual layers of the plurality of layers are essentially congruous blanks.

23. A cushion element according to claim 14, wherein the guide slit has upper and lower delimiting surfaces, the plurality of layers being arranged to extend essentially parallel to the delimiting surfaces of the guide slit.

24. A cushion element according to claim 14, wherein the cushion material consists at least partially of a foamed material in which the plurality of layers of at least one of foil, sheet material and fabric are foamed in place.

25. A cushion element according to claim 14, wherein the cushion material is a rigid foam, and further comprising a flexible-foam covering at least on a top side of the body.

26. A cushion element according to claim 25, wherein the flexible-foam covering is configured to cover edges of the plurality of layers of foil, sheet material and fabric which one of project beyond the rigid foam and are cut off at delimiting surfaces of the rigid foam.

27. A cushion element for a passenger-restraining system including a lap belt, comprising:
    a body made of at least one cushion material which can be deformed so as to absorb energy and having a guide slit for the lap belt;
    a functional part retained in the deformable cushion material so as to surround the guide slit;
    a cover configured to enclose the cushion element; and
    a reinforcement formed as part of the cover and arranged in a region of the guide slit.

* * * * *